(12) United States Patent
Ferrari

(10) Patent No.: US 7,384,224 B2
(45) Date of Patent: Jun. 10, 2008

(54) MULTI-AXIS MACHINE TOOL

(75) Inventor: Maurizio Stefano Ferrari, Pizzighettone (IT)

(73) Assignee: JOBS S.p.A., Piacenza (IT)

( * ) Notice: Subject to any disclaimer, the term of this patent is extended or adjusted under 35 U.S.C. 154(b) by 0 days.

(21) Appl. No.: 11/819,773

(22) Filed: Jun. 29, 2007

(65) Prior Publication Data

US 2008/0003073 A1    Jan. 3, 2008

(30) Foreign Application Priority Data

Jun. 29, 2006   (IT)   ............................ BO2006A0500

(51) Int. Cl.
*B23C 1/12*   (2006.01)
(52) U.S. Cl. ..................... 409/212; 409/201; 409/216
(58) Field of Classification Search ................ 409/201, 409/202, 212, 211, 216, 235; 408/236–237; 29/34 B See application file for complete search history.

(56) References Cited

U.S. PATENT DOCUMENTS

| | | | | |
|---|---|---|---|---|
| 4,658,485 A * | 4/1987 | Yang | .......................... | 409/202 |
| 5,664,308 A * | 9/1997 | Deitert | ....................... | 409/216 |
| 5,839,323 A * | 11/1998 | Line | ........................... | 409/212 |
| 6,352,496 B1 * | 3/2002 | Oldani | ....................... | 409/216 |
| 6,357,094 B1 * | 3/2002 | Sugimoto | .................... | 409/212 |
| 6,825,630 B2 * | 11/2004 | Katoh et al. | ................ | 409/201 |
| 7,134,173 B2 * | 11/2006 | Gstir et al. | ................. | 409/201 |
| 7,255,519 B2 * | 8/2007 | Tanoue et al. | ............. | 409/212 |
| 2004/0151556 A1 * | 8/2004 | Ferrari et al. | ............... | 409/201 |
| 2007/0059116 A1 * | 3/2007 | Brunemann | ................. | 409/201 |

FOREIGN PATENT DOCUMENTS

| | | |
|---|---|---|
| DE | 20204365 U1 * | 7/2002 |
| DE | 10348691 A1 * | 5/2005 |
| WO | WO-03/078101 A1 * | 9/2003 |

OTHER PUBLICATIONS

EPO Search report re application No. EP 07 11 0737, 7 pages.*

* cited by examiner

*Primary Examiner*—Erica Cadugan
(74) *Attorney, Agent, or Firm*—Timothy J. Klima

(57) ABSTRACT

A multi-axis machine tool presents a gantry positioned over a bed equipped with a machining station in which to position a workpiece, a moving beam associated slidably with the gantry, aligned on a horizontal direction and translatable in a vertical direction, a carriage associated slidably with the moving beam and traversable in the horizontal direction, and a tool holder mounted to the carriage. The tool holder is mounted direct to the carriage, making no use of quills or telescopic arms, with freedom to rotate relative to the carriage about two positioning axes.

19 Claims, 3 Drawing Sheets

MULTI-AXIS MACHINE TOOL

BACKGROUND OF THE INVENTION

The present invention relates to a multi-axis machine tool of which the essential features are recited in the preamble of claim 1 appended.

More particularly, the invention is pertinent to the art field of numerically controlled multi-axis machine tools used to perform high-speed milling operations.

Conventionally, such machine tools are utilized particularly in the aerospace industries for contouring and drilling parts made of aluminum and composite materials, and in the automobile sector for producing master models, models for bodywork, internal parts and dies.

Multi-axis machines of the type in question comprise a frame, or gantry, composed of two upright members with first ends anchored slidably or otherwise to the bed of the machine, and a horizontal cross member extending between and rigidly associated with the second ends of the two upright members.

Such machines also comprise a moving horizontal member, or beam, sliding on the upright members and consequently positionable closer to or farther from the bed. The bed affords a machining station to which the workpiece is secured.

The moving beam is coupled slidably by its two opposite ends to the upright members and serves to support a carriage, traversable horizontally along the beam. The carriage in turn carries a machining head with a tool holder, to which the tool best suited to the machining operation is clamped.

More particularly, a first conventional type of multi-axis machine is equipped with a tool holder having one degree of freedom, namely rotational, relative to the carriage traversable horizontally along the moving beam.

In this instance, the machining station has two degrees of freedom relative to the gantry of the machine tool, in that the station is translatable and rotatable with respect to the gantry.

Accordingly, the machine tool has five degrees of freedom and is able to perform the requisite operations on the workpiece correctly.

In reality however, machine tools of this type will not allow particularly large workpieces to be processed, given that during the rotation of the machining station, such bulky items would interfere with the uprights of the gantry and effectively prevent the work from being positioned correctly in relation to the tool holder.

In another conventional type of machine tool, the tool holder has two degrees of freedom relative to the carriage traversable horizontally along the moving beam.

In particular, the tool holder is mounted to a quill extendible along a vertical axis relative to the carriage and rotatable about this same vertical axis.

In this instance, the machining station possesses just one degree of freedom relative to the gantry, consisting in relative translational motion between gantry and station.

Accordingly, the machine tool has five degrees of freedom and is able to perform the requisite operations on the workpiece correctly.

With this second type of design, however, the rigidity of the connection between tool and machine is afforded by the rigidity of the quill, and since the rigidity of the quill when extended from the carriage is decidedly low, when compared to that of the carriage and the moving beam, high machining accuracy cannot be guaranteed.

Moreover, because the rigidity in question is dependent on the portion of the quill projecting from the carriage, the load transmissible from the tool to the workpiece compatible with a given level of machining accuracy can never be constant, as the maximum load applicable to the work in machining has to be calculated on the basis of the distance the quill is extended from the tool carriage.

The applicant finds that multi-axis machine tools of the prior art are improvable in a number of ways, with regard particularly to the accuracy and flexibility in machining of which they are capable.

In the light of the foregoing, the main object of the present invention is to provide a multi-axis machine tool unaffected by the drawbacks mentioned.

In particular, the object of the invention is to set forth a multi-axis machine tool capable of high machining accuracy.

A further object of the present invention is to set forth a multi-axis machine tool able to process workpieces of sizeable proportions.

SUMMARY OF THE INVENTION

The stated object is realized according to the present invention in a multi-axis machine tool comprising a gantry, associated with a bed presenting a machining station in which to accommodate a workpiece, a moving beam extending in a horizontal direction, associated slidably with the gantry and capable of motion in a vertical direction, a carriage associated slidably with the moving beam and capable of motion in a horizontal direction, and a tool holder mounted to the carriage. In the machine disclosed, the tool holder is rotatable relative to the carriage about two mutually perpendicular positioning axes.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
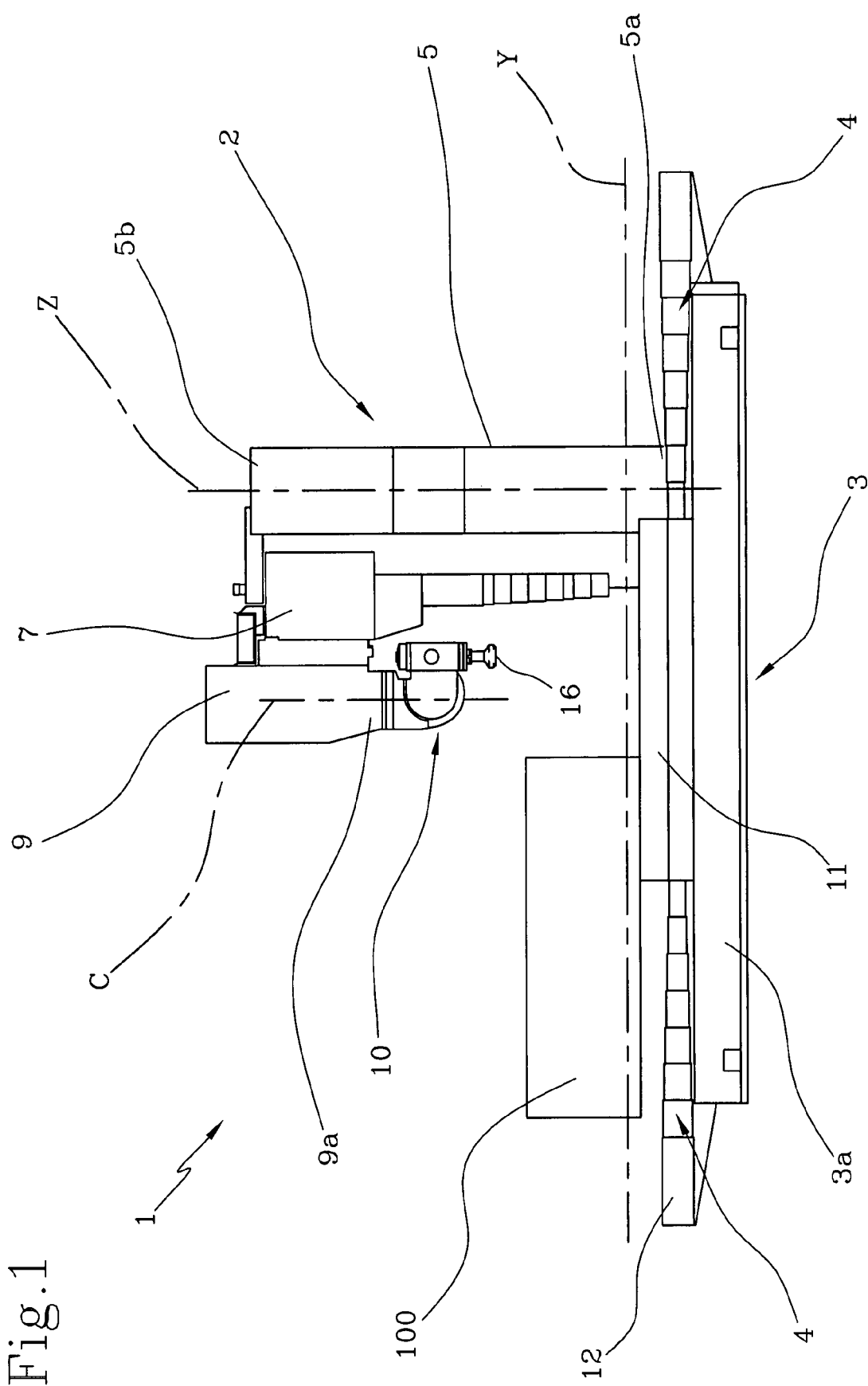
FIG. 1 shows a multi-axis machine tool according to the present invention, in a side elevation view.

With reference to the drawings, numeral 1 denotes a multi-axis machine tool, in its entirety.

The machine 1 presents a gantry 2 associated with a bed 3, the bed in turn equipped with a machining station 4 to accommodate a workpiece 100.

In particular, the gantry 2 comprises a first upright member 5 and a second upright member 6 extending in a vertical direction "Z", of which respective first ends 5a and 6a are positioned along two opposite sides 3a and 3b of the bed 3. The gantry 2 further comprises a third member 7 rigidly associated with the two upright members 5 and 6, extending in a substantially horizontal direction between second ends 5b and 6b of the selfsame members 5 and 6.

The machine 1 also comprises a beam 8 extending in a horizontal direction "X", associated slidably with the gantry 2 and capable thus of movement in the vertical direction "Z". The beam 8 is attached to the gantry 2 by way of opposite ends 8a and 8b coupled slidably with the two upright members 5 and 6. Motion is induced in the beam 2 preferably by means of linear electric motors.

As discernible clearly in FIG. 1, the beam 8 is cantilevered from the gantry 2 so as to slide vertically, relative to the gantry, in a plane parallel to and distanced from the vertical axes on which the upright members 5 and 6 are aligned.

The beam 8 is equipped with a carriage 9 mounted slidably in the horizontal direction "X", of which a bottom portion 9a carries a machining head with a tool holder 10. The carriage 9 is cantilevered from the beam 8 on the side remote from the two upright members 5 and 6, as shown in FIG. 1.

Advantageously, the tool holder 10 is rotatable in relation to the carriage 9 about two mutually perpendicular axes denoted "C" and "D".

Configured thus, the machine 1 has five degrees of freedom and is able to perform practically any machining operation on the workpiece 100.

The five degrees of freedom of the tool holder 10 are given by the two angular movements about the axes or rotation "C" and "D", by the translational movements in the horizontal direction "X" and in the vertical direction "Z", and by a translational movement in a longitudinal direction denoted "Y".

This last-mentioned translational movement can be obtained by causing the gantry 2 to traverse in the longitudinal direction "Y" relative to the bed 3, hence in relation also to the machining station 4, for example by means of linear electric motors.

In the preferred embodiment of the drawings, translation in the longitudinal direction "Y" is obtained by rendering the machining station 4 capable of movement relative to the bed 3. In particular, the machining station 4 comprises a table 11, to which the workpiece 100 is stably anchored, slidable along ways 12 presented by the bed 3 and extending in a direction parallel to the longitudinal direction "Y". Thus, the table 11 is able to pass through the opening presented by the gantry 2, and the workpiece 100 can be positioned with any given point of its surface beneath the tool holder 10.

The gantry 2 therefore remains fixed in relation to the bed 3, and machining accuracy is increased by virtue of the fact that a solution of this kind eliminates errors of alignment (not always linear) occurring between the tool holder 10 and the workpiece 100 as a result of the complex coupling between a slidable gantry 2 and the relative bed 3.

Regardless of how the degree of freedom in the longitudinal direction "Y" is guaranteed, in any event, the solution of a tool holder 10 rotatable relative to the carriage 9 about the two mutually perpendicular axes "C" and "D", as aforementioned, ensures superior rigidity and machining accuracy on the part of the selfsame tool holder 10.

In effect, the tool holder 10 is mounted direct to the carriage 9, dispensing with the use of any telescopic element or quill type connection; thus, the tool holder 10 always remains at the same distance from the carriage 9 irrespective of the operating position assumed.

Figure 3:
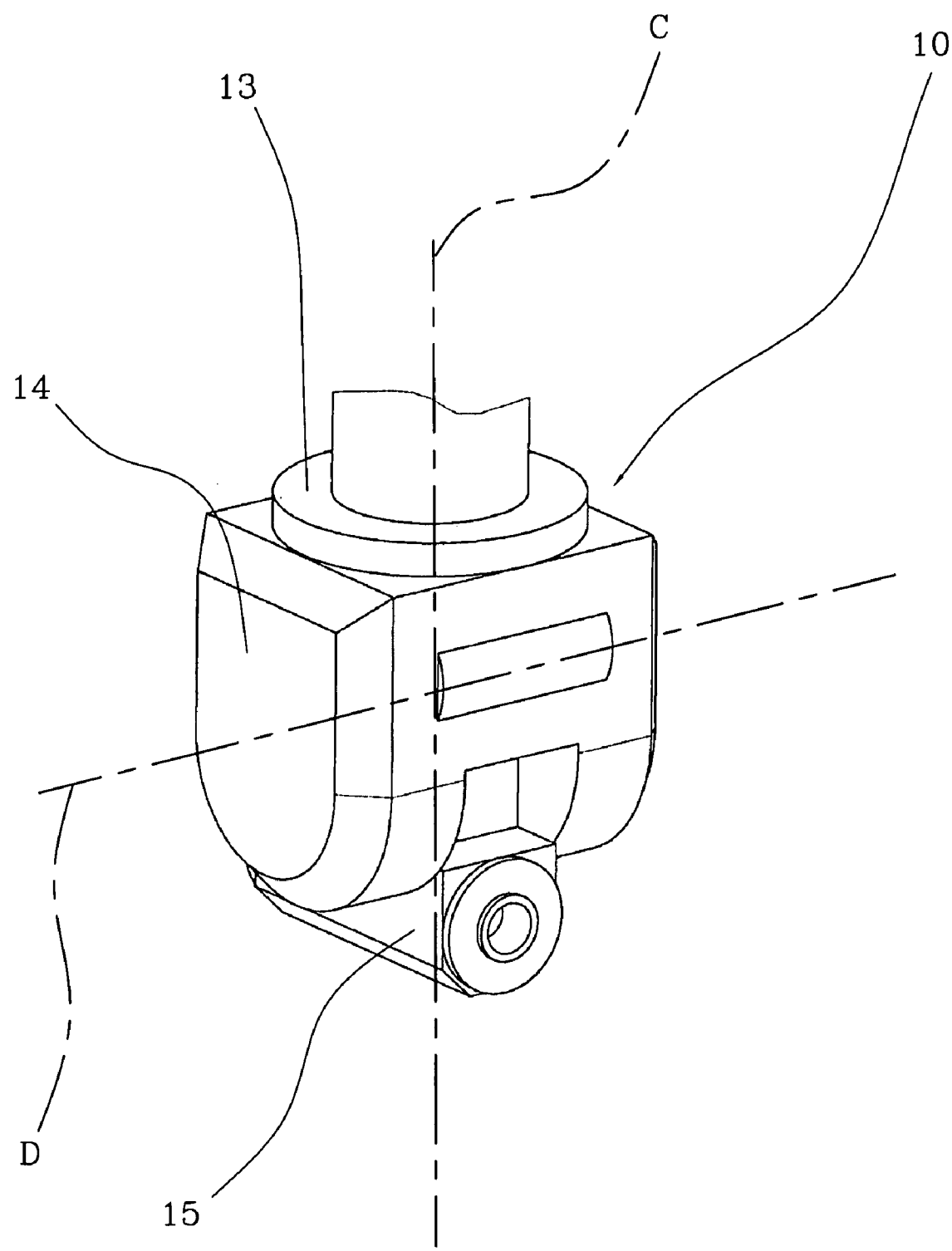
FIG. 3 is a detail of the machine in FIG. 1, viewed in perspective.

More exactly, referring to FIGS. 1 and 3, the tool holder 10 is rotatable about a first axis "C" extending parallel to the vertical direction "Z", and about a second axis "D" extending parallel to the horizontal direction "X".

The two rotational axes "C" and "D" of the tool holder 10 are non-intersecting, the first axis "C" being located farther from the moving beam 8 than the second axis "D", in such a way that the tool holder 10 can assume operating positions to be described in due course.

In the preferred embodiment illustrated, and with reference in particular to FIG. 3, the tool holder 10 comprises a coupling portion 13 attached to the bottom portion 9a of the carriage 9, a central body 14 connected to the side of the coupling portion 13 opposite from the carriage 9, and a support element 15 attached to the central body 14, in which a machining tool 16 is held.

The coupling portion 13 is anchored pivotably to the carriage 9 and rotatable thus about the first axis "C", relative to the carriage 9, the central body 14 is anchored pivotably to the coupling portion 13 and rotatable about the second axis "D", relative to this same portion 13, and the support element 15 is rigidly associated with the central body 14.

Figure 2:
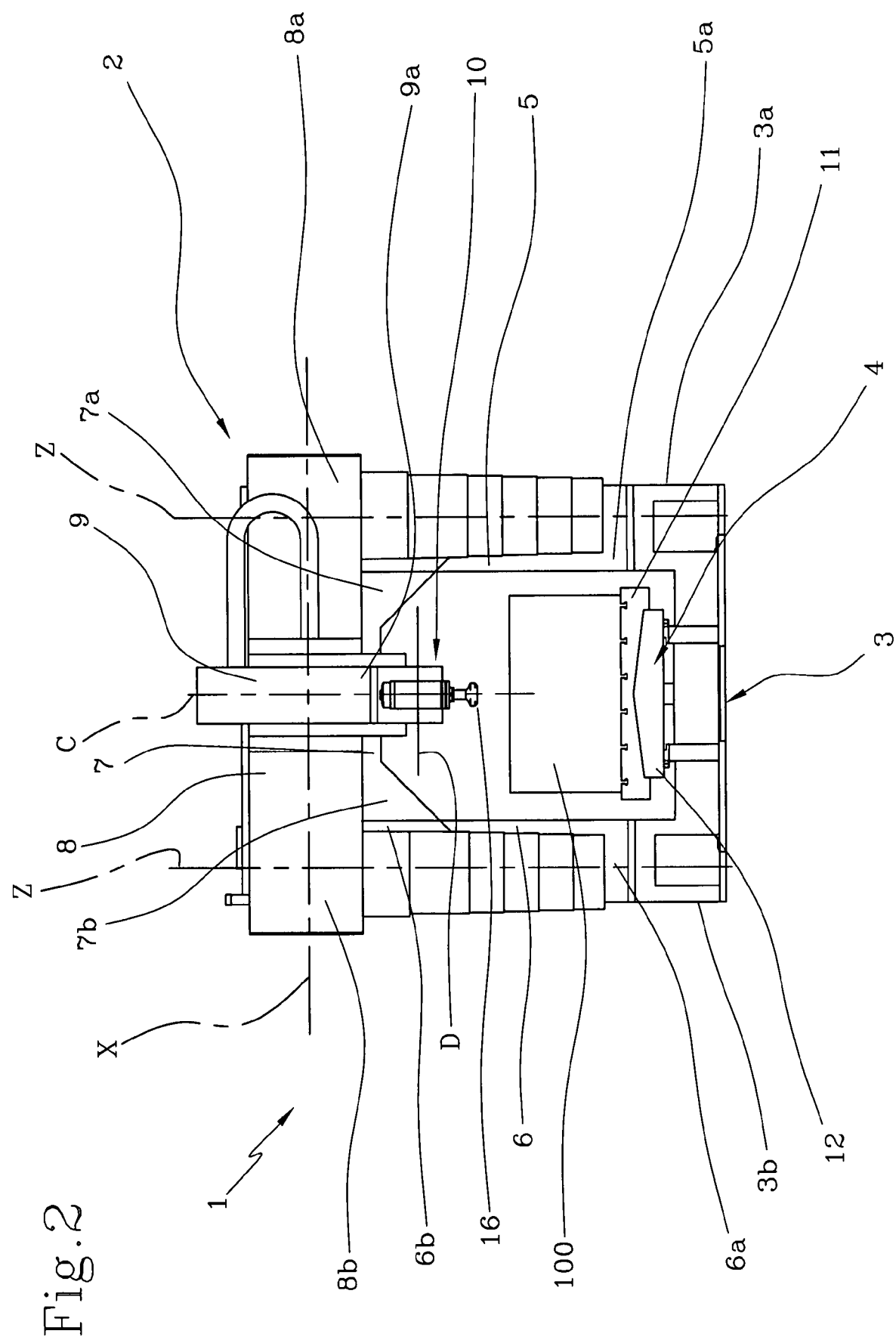
FIG. 2 is a front elevation view of the machine shown in FIG. 1.

Advantageously, the support element 15 is secured to the central body 14 and cantilevered in such a manner that when rotated about the non-intersecting orthogonal axes "C" and "D", the machining tool 16 will remain outside the dimensional envelope of the tool holder 10, as illustrated in FIGS. 1 and 2. In this way, the tool 16 will never interfere with the holder 10, with the carriage 9, with the beam 8 or with the gantry 2, and all parts of the workpiece 100 can be machined, including the side edges and end edges.

In the preferred embodiment shown, moreover, the gantry 2 is embodied in one piece, in other words the first, second and third members 5, 6 and 7 form an integral whole, with no additional connecting elements between one and the next. Similarly, the moving beam 8 is embodied in a single piece, as also is the carriage 9. This feature helps to increase the machining accuracy of the equipment further, in that there is no necessity to calculate and make allowance for any thermal or mechanical deformation of elements which, in prior art machine tools, serve to join the various components of the gantry, the moving beam and the carriage.

The drawbacks mentioned at the outset are overcome by the present invention, and the stated objects duly realized.

First and foremost, a tool holder able to rotate about two orthogonal axes can be mounted directly to the carriage, requiring no extendible quill or other such element. Consequently, the rigidity of a tool holder in a machine according to the invention remains constant throughout machining operations, affording greater precision as a result.

In addition, the adoption of a tool holder embodied in this way ensures that the tool can address any point on a workpiece, even items of appreciable bulkiness, given that neither the work nor the tool holder will ever interfere with the structure of the machine.

The invention therefore has important advantages.

In effect, a gantry rigidly associated with the machine bed further enhances machining accuracy.

With a one-piece gantry, moreover, and similarly a one-piece carriage and one-piece beam, the machine is rendered easily transportable by a vehicle designed to carry abnormal loads, and ensures ease of installation on site.

Indicatively, the machine tool 1 described and illustrated is capable of handling workpieces up to 2.5 meters in length and 1.5 meters in breadth. The rated spindle power of the machine 1 would be in the order of 45-50 kW.

The invention claimed is:

1. A multi-axis machine tool, comprising:
    a gantry including first and second upright members connected by a horizontal third member, associated with a bed presenting a machining station in which to accommodate a workpiece;
    a moving beam having a central longitudinal axis extending in a horizontal direction, associated slidably with the gantry and capable of motion relative to the gantry in a vertical direction;

a carriage associated slidably with the moving beam and capable of motion relative to the moving beam in a horizontal direction;

a tool holder mounted to the carriage and rotatable, relative to the carriage, about two axes perpendicular one to another that do not intersect, and wherein a vertical one of the two axes is vertical regardless of rotated position of the tool holder about either of the two axes.

2. A machine tool as in claim 1, wherein the tool holder is mounted directly to a bottom portion of the carriage.

3. A machine tool as in claim 1, wherein the vertical one of the two axes is a first axis, and the other one of the two axes is a second axis parallel to the horizontal direction.

4. A machine tool as in claim 3, wherein the tool holder comprises a coupling portion attached to the carriage, a central body connected to the coupling portion and a support element, associated with the central body, in which a machining tool is held.

5. A machine tool as in claim 4, wherein the coupling portion is anchored pivotably to the carriage and rotatable about the first axis parallel to the vertical direction.

6. A machine tool as in claim 5, wherein the central body is anchored pivotably to the coupling portion and rotatable relative to the selfsame portion about the second axis parallel to the horizontal direction.

7. A machine tool as in claim 6, wherein the support element is rigidly associated with and cantilevered from the central body.

8. A machine tool as in claim 3, wherein the first rotational axis of the tool holder is positioned at a first fixed distance from the gantry, and wherein the second rotational axis of the tool holder is positioned at a second variable distance from the gantry.

9. A machine tool as in claim 4, wherein the support element is rotatable about the first axis and the second axis between a plurality of positions in which an associated machining tool remains outside the dimensional envelope of the tool holder.

10. A machine tool as in claim 1, wherein the moving beam is cantilevered from the gantry.

11. A machine tool as in claim 1, wherein the carriage is cantilevered from the moving beam on the side remote from the gantry.

12. A machine tool as in claim 1, wherein the machining station and the gantry have a degree of translational freedom one relative to the other in a longitudinal direction of the machine tool perpendicular to the horizontal direction of the moving beam and to the vertical direction.

13. A machine tool as in claim 12, wherein the gantry is fixed relative to the bed, and the machining station is capable of movement relative to the bed in the longitudinal direction of the machine tool.

14. A machine tool as in claim 13, wherein a workpiece accommodated by the machining station is anchorable to a table slidable along ways presented by the bed and extending in a direction parallel to the longitudinal direction of the machine tool.

15. A machine tool as in claim 1, wherein the first upright and the second upright extend parallel to the vertical direction and have respective first ends located along two opposite sides of the bed, also the third member is rigidly associated with the first and second members, and extends parallel to the horizontal direction of the moving beam and is anchored at opposite ends to the selfsame first and second uprights.

16. A machine tool as in claim 15, wherein the moving beam is cantilevered from and slidable on the first and second uprights.

17. A machine tool as in claim 1, wherein the gantry is embodied in one piece.

18. A machine tool as in claim 1, wherein the moving beam is embodied in one piece.

19. A machine tool as in claim 1, wherein the carriage is embodied in one piece.

* * * * *